United States Patent [19]

O'Loughlin

[11] Patent Number: 4,625,316
[45] Date of Patent: Nov. 25, 1986

[54] HIGH EFFICIENCY ELECTRON BEAM GUN FOIL SUPPORT

[75] Inventor: James P. O'Loughlin, Albuquerque, N. Mex.

[73] Assignee: The United States of America as represented by the Secretary of the Air Force, Washington, D.C.

[21] Appl. No.: 661,549

[22] Filed: Oct. 17, 1984

[51] Int. Cl.$^4$ .............................................. H01S 3/09
[52] U.S. Cl. ..................................... 372/74; 372/61; 372/34; 372/701
[58] Field of Search ...................... 372/74, 61, 34, 33, 372/37, 72, 701, 55

[56] References Cited

U.S. PATENT DOCUMENTS

| | | | |
|---|---|---|---|
| 3,808,551 | 4/1974 | Ahouse | 372/55 |
| 4,143,336 | 3/1979 | Searles et al. | 331/94.5 G |
| 4,230,994 | 10/1980 | Bradley | 331/94.5 PE |

Primary Examiner—Léon Scott, Jr.
Attorney, Agent, or Firm—Donald J. Singer; William G. Auton

[57] ABSTRACT

The reduction of the grazing angle of electrons in an electron gun with a cathode emitting a beam of electrons which pass through a thin foil into a chamber is accomplished by geometrically tailored electron gun foil supports. One embodiment of the invention replaces the conventional rectangular shaped ribs with a set of triangular shaped ribs which produce a grazing angle A given by the equation $$A = \tfrac{1}{2} \tan^{-1}\left[\frac{T/2 + S}{H}\right]$$

where
T = the base width of the rib
S = space between ribs at the base
H = height of the rib
A = the angle the rib side makes with the incident electron which is perpendicular to the base
A = also the angle the electron scatters at from the rib surface.

Another embodiment of the tailored foil supports entails the addition of triangular shaped caps to existing rectangular shaped ribs. The resultant reduction of the grazing angle of electrons improves the transmission efficiency of the electron gun and reduces the heat buildup on the supports and foil.

9 Claims, 10 Drawing Figures

HIGH EFFICIENCY ELECTRON BEAM GUN FOIL SUPPORT

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the components of laser systems and specifically to the design of an electron beam gun foil support.

It is well known in the art that lasers of various types are in use and experimentation of new types are under study. Such lasers include solid state, chemical and gaseous types.

The laser utilizes the interaction of electromagnetic radiation with a material having an appropriate set of discrete energy levels.

For example, gaseous laser media with electron beams discharged across the gas are old in the art. There are many categories of gaseous laser media such as the molecular media exemplified by $CO_2$. Of recent interest have been the rare gas excimer lasers, and the rare gas halide excimer lasers, and the rare gas atomic oxygen and the rare gas atomic iodine transfer lasers. For example, laser action was reported for an electron-beam pumped apparatus for bands of KrF and XcCl in Applied Physics Letters 27, 350 (1975). The excimer systems are well known for their efficiency derived in part from a bound excited state and weakly bound or unbound lower state, the excited state having a lifetime of typically 10 nanoseconds. Interest in the above lasers is due additionally to their ultraviolet and visible wavelengths. Such lasers are useful in laser isotope separation at relatively low energy per pulse (greater than or equal to one joule) and at high repetition rates (greater than or equal to 1 kHz). These lasers are also useful in attaining laser fusion which requires much higher energy pulses but much lower repetition rates. Such lasers are useful for other purposes known to persons working in the laser art.

Among the major components of a gaseous type laser system is an electron beam source, having a discharge cell separated from a vacuum by a foil, such as the gas discharge laser systems described in U.S. Pat. No. 4,143,336 issued to Searles et al on Mar. 6, 1979 and U.S. Pat. No. 4,230,994 issued to Bradley on Oct. 28, 1980 and incorporated herein by reference.

In high power electron guns the heat load on the foil support can be very severe; as high as 750 watts/cm$^2$ on the (conventional design) support itself. The support structure must also provide cooling for the foil. By comparison, the loss in the foil is typically as high as 75 watts/cm$^2$. So consequently, the cooling burden is nearly all from the foil support. A method is needed which reduces this burden by a factor of three or more which results in a much simpler cooling system and a far more reliable foil due to the fact it can now be simpler cooling system and a far more reliable foil due to the fact it can now be more easily cooled. Another advantage would be the fact that the electron transmission efficiency would be increased by about a factor of up to two. This means that the current emission density on the cathode is reduced correspondingly and the cathode life reliability and performance all improve. Also, the overall system efficiency is improved. For example, a large excimer laser electron gun may require 100 megawatts average power with a conventional foil support.

In view of the foregoing discussion, it is apparent that there exists the need for an improved high efficiency electron beam gun foil support that reduces the power loss and improves the electron transmission efficiency. The present invention is directed towards satisfying that need.

SUMMARY OF THE INVENTION

The present invention describes an electron gun foil support which is found in the environment of electron guns where a cathode emits electrons in a vacuum chamber. The electrons are accelerated by a high voltage and then passed through a thin foil into the region where they are used. The invention solves the problem of preventing heat build-up on the foil. The novel feature of the invention is the design of the foil support rib which has a low grazing angle whereby electrons impart a small part of their energy on the foil support rib surface.

The foil support design which reduces the grazing angle of the electrons directed at the foil is accomplished through the use of a plurality of geometrically designed, triangular shaped ribs each having their base adjacent to the foil and presenting precisely designed angled surfaces, which are arranged in such a manner as to both provide the foil support function and also scatter the electrons, which would otherwise be totally absorbed by conventional unsophisticated supports, thru the foil with a minimal loss.

The support ribs are designed with a triangular cross section with the dimensions and relations chosen such that an incident electron striking anywhere on the surface of the rib will scatter at an angle $\alpha'$ and will then not strike the adjacent rib but will pass thru the foil. The algebraic and trigonometric relation are:

$$\alpha' = \tfrac{1}{2} \tan^{-1}\left[\frac{T/2 + S}{H}\right]$$

$$H = \frac{T}{2 \tan \alpha'}$$

Where:
T = the base width of the rib
S = space between ribs at the base
H = height of the rib
$\alpha'$ = the angle the rib side makes with the incident electron which is perpendicular to the base
$\alpha'$ = also the angle the electron scatters at from the rib surface It is a principal object of the present invention to provide an improved foil support for use in electron beam guns in laser systems.

It is another object of the present invention to present a foil support presenting a low grazing angle to electrons.

It is another object of the present invention to improve the electron transmission efficiency in laser systems.

It is another object of the present invention to reduce the power loss and cooling burden in laser systems.

These together with other objects features and advantages of the invention will be come more readily apparent from the following detailed description when taken in conjunction with the accompanying drawing wherein like elements are given like reference numerals throughout.

DETAILED DESCRIPTION OF THE PREFERRED EMBODIMENT

The present invention provides a high efficiency electron beam gun foil support that reduces the power loss and improves the electron transmission efficiency in laser systems by presenting low grazing angles to the electron beam directed at the foils in the electron gun of laser systems.

Figure 1:
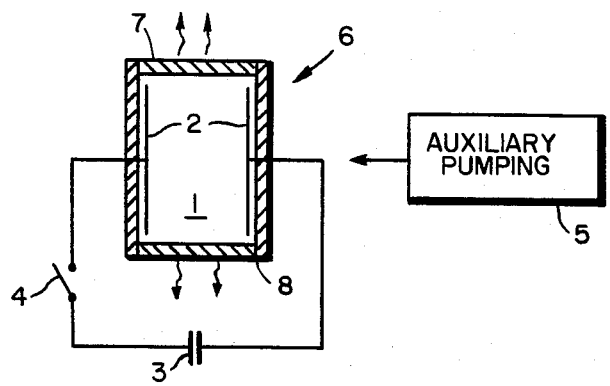
FIG. 1 is a block diagram of a prior art discharge laser system.

FIG. 1 is a block diagram of a prior art gas discharge laser system. The gas discharge laser medium 1 is between two discharge electrodes 2. A voltage and power source 3 charges the two discharge electrodes 2 when switch 4 is closed. Auxiliary pumping means 5 increases the free electrons in the laser medium to produce uniform electron deposition, to provide initial electron density, and to replace electron losses to recombination or attachment. This auxiliary electron production may be from an e-beam, a plasma, photoionization, controlled predischarges or a combination of these. Chamber (or cavity) 6 contains the gaseous laser medium, and mirrors 7 and 8 provide for partial transmission and partial reflection at the cavity ends for the laser wavelength. One mirror may be totally reflecting if output in one direction is desired.

Figure 2:
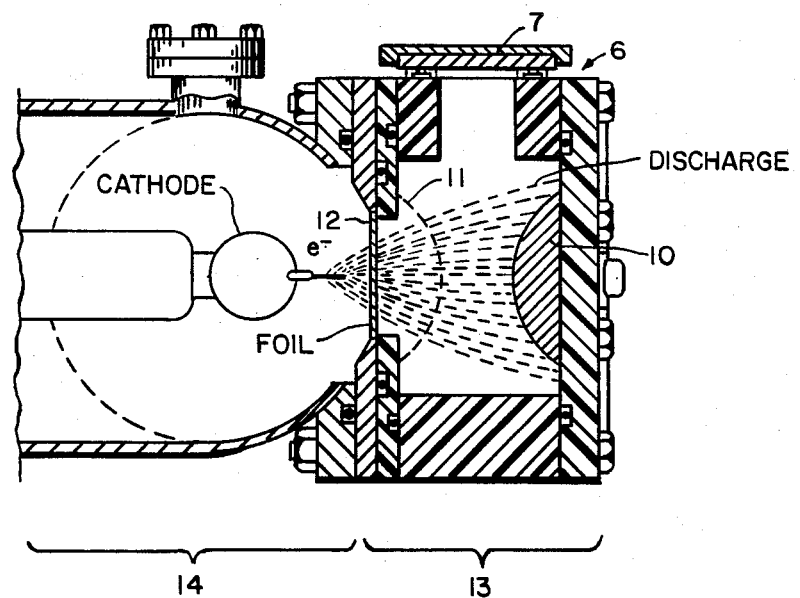
FIG. 2 is a cross sectional view of the electron beam source of the laser of FIG. 1.

FIG. 2 shows a cross-sectional view of major components in the electron beam source 14 and the gas discharge cell 13, in the FIG. 1 apparatus. The electron beam source 14 is driven directly by a 400 kV Marx bank. The output impedance of the pulsed power supply is adjusted with tuned circuits in series with the e-beam source to give a nominally flat-topped beam current pulse with a rise time of 20 nsec and a pulse width of 110 nsec over a window area of 2×40 cm. Beam-current densities between 2 and 15 amperes/cm$^2$ are obtained by varying the anode-cathode spacing of the e-beam source.

The FIG. 2 discharge chamber 13 was constructed of Teflon. The sustainer electrodes 10, 11 were cut to a semi-Rogowski profile. There is a solid aluminum electrode 10 and fine stainless steel mesh electrode 11 backed by a 25 micron thick kapton foil 12 which separates the discharge cell 13 from the vacuum in the e-beam source 14.

The novel feature of the invention is use of the knowledge that low grazing angle electrons impart only a small amount of their energy to the encountered surface and then recognized that it is possible to geometrically design ribs with angled surfaces and to arrange them in such a manner as to both provide the foil support function and also scatter the electrons, which would otherwise be totally absorbed by conventional unsophisticated supports, thru the foil with a minimal loss.

The invention solves several problems. In high power electron guns the heat load on the foil support can be very severe; as high as 750 watts/cm$^2$ on the (conventional design) support itself. The support structure must also provide cooling for the foil. By comparison, the loss in the foil is typically as high as 75 watts/cm$^2$. So consequently, the cooling burden is nearly all from the foil support. This invention reduces this burden by a factor of three or more which results in a much simpler cooling system and a far more reliable foil due to the fact it can now be more easily cooled. Another advantage is the fact that the electron transmission efficiency is increased by about a factor of up to two. This means that the current emission density on the cathode is reduced correspondingly and the cathode life reliability and performance all improve. Also, the overall system efficiency is improved. For example, a large excimer laser electron gun may require 100 megawatts average power with a conventional foil support. This could be reduced to as low as 60 megawatts by use of this invention.

Figure 3:
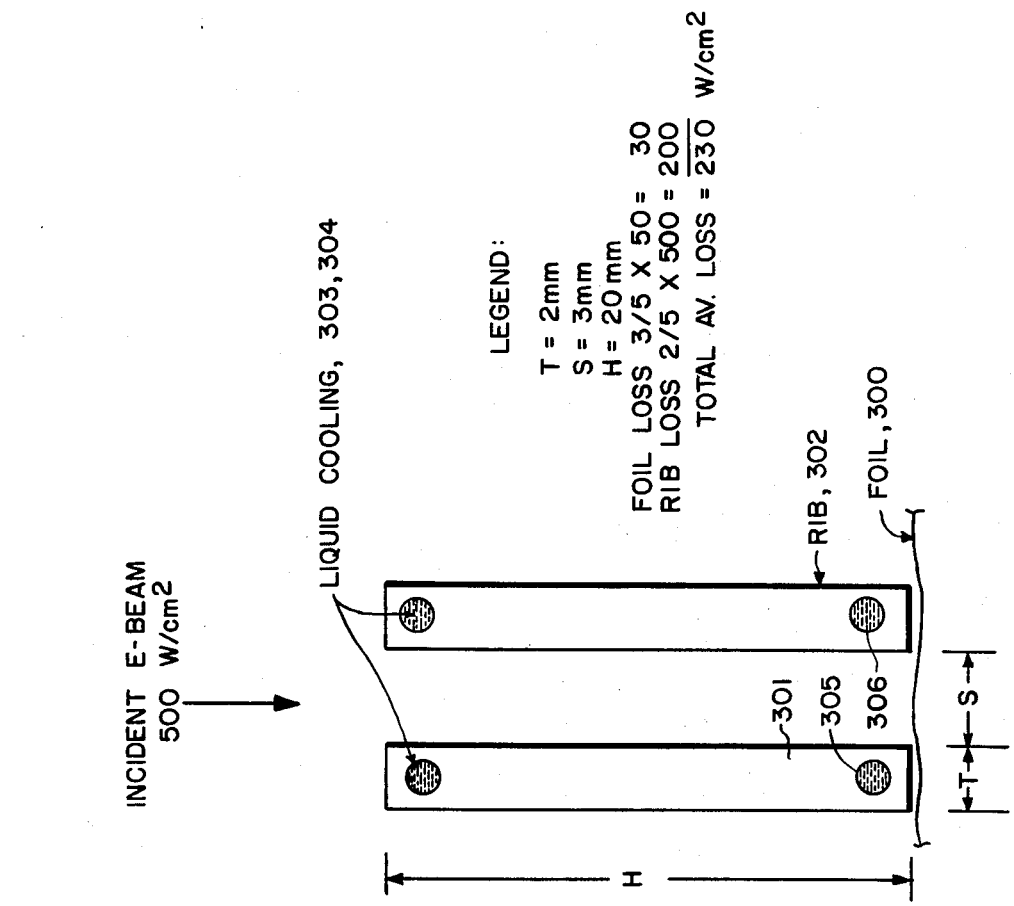
FIG. 3 is a sketch of the conventional rib approach to foil support.

FIG. 3 is a sketch of the conventional rib approach to foil support. The foil 300 is supported by two rectangular ribs 301 and 302 which have a height H of 20 mm, a thickness T of 2 mm and a spacing of 3 mm between them. Liquid cooling is conducted in ducts 303-306 in the ribs to accomplish a heat transfer. The height of the ribs is normal to the plain of the foil 300, and the top end of the ribs presents a planar surface to the incident electron beam. With an electron beam strength of 500 watts/cm$^2$ the severe heat loading on excimer laser e-gun foil support structures results in a high risk situation for foil reliability and life and requires extraordinary measures to accomplish the overall heat transfer. For the typical structure in FIG. 3, the ribs 300 and 302 are 2 mm×20 mm on the foil 300, with 3 mm spacing. The average e-beam incident power is 500 W/cm$^2$ and the average foil deposition is about 50 W/cm$^2$. The average power loading on the foil and support structure combined is 230 W/cm$^2$.

So the cooling system 303-306 must carry 230 W/cm$^2$ average and is predominantly burdened by the 200 W/cm$^2$ rib contribution.

Figure 4:
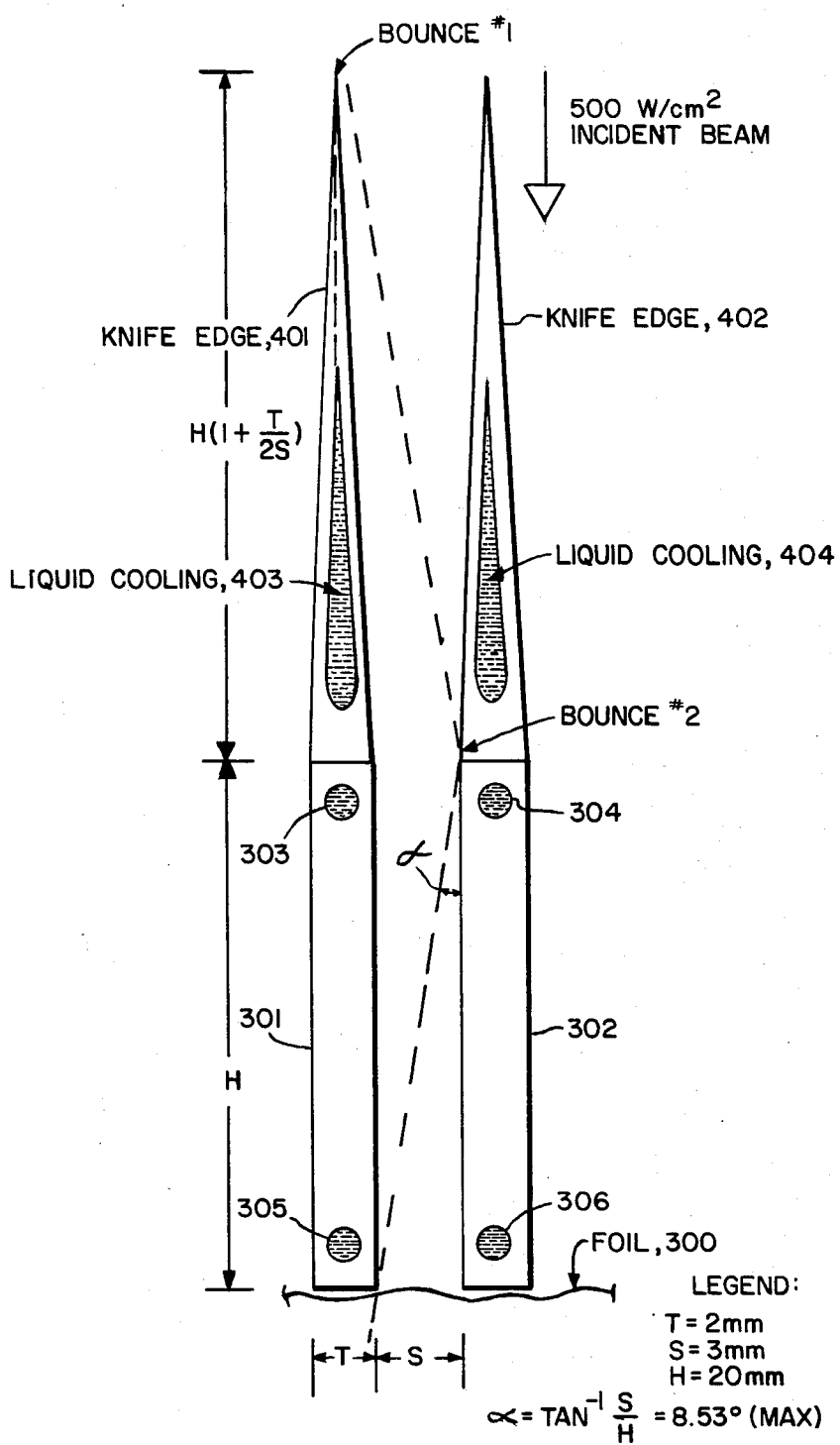
FIG. 4 is an illustration of one embodiment of the invention.

FIG. 4 is an illustration of the invention applied to the conventional rib approach shown in FIG. 3. As illustrated, two designed knife edges 401 and 401 have been added to the ribs 301 and 302 which support the foil. As mentioned above, electron beam guns operate with a cathode emitting electrons in a vacuum chamber. The electrons are accelerated by a high voltage and then passed thru a thin foil into the region where they are to be utilized. Usually this utilization takes place in a gas at high pressure (i.e., much higher than vacuum). Thus a foil support is required to withstand the pressure of the gas. Unfortunately, the foil support has a geometric shadow, typically as much as 50%. Heretofore, the total interception of the beam by the geometrical shadow of the foil support and the resulting loss has been accepted as a fact of life. The invention is a foil support structure which accomplishes a vast reduction in the beam energy absorbtion and a corresponding improvement in electron transmission efficiency greater than the geometric shadows of the foil support structure. This is accomplished by recognizing the fact that low grazing angle electrons scatter from surfaces with only a small portion of their energy imparted to the surface. Taking this into account, one designs the ribs of the foil support between the ribs and thus thru the foil with only a small fraction of the loss traditionally experienced by conventionally designed, total geometric shadow absorbing foil supports.

The design of the knife edges in FIG. 4 uses the "two bounce rib" concept such that the low grazing angle electrons impart only a small amount of their energy to the encountered surface. The ribs 301 and 301 of FIG. 7 have the same dimensions as their like enumerated counterparts in FIG. 3; height (H)=20 mm, thickness (T)=2 mm and spacing (S)=3 mm. The knife edges are designed to allow the electrons from the incident beam which strike the knife edge and attached ribs to have "two bounces" or strikes at most. As shown in FIG. 4, an electron is striking at the top knife edge 401, to be deflected to the base at knife edge 402 where it is deflected one final time.

Experience has shown that the electrons striking a surface reflect at an angle approximately equal to their incident angle ($\alpha$). The geometry of the ribs and knife edge design of FIG. 4 is related to this deflection angle by the following equation:

$$\alpha = \tan^{-1} \frac{S}{H} \qquad 1$$

Where S=the spacing between the ribs and H equals the height of the ribs.

The value of $\alpha$ produced by the ribs in FIG. 4 is 8.53° maximum. The knife edges added to the ribs are triangular from the end view, with a base of thickness (T) equal to the thickness of the ribs, and a height H' given by the following equation:

$$H' = H\left(1 + \frac{T}{2S}\right) \qquad 2$$

Where H' equals the height of the knife edge; H equals the height of the ribs, T equals the thickness of the ribs and S equals the spacing between the ribs.

The power loss experienced by both the ribs and foil in FIG. 4 equals the sum of the power loss due to the ribs plus and the power loss due to the foil.

The rib loss is given by the equation below:

$$\text{Rib Loss} = 500 \text{ W/cm}^2 \times \sin\alpha + 500(1 - \sin)\sin\alpha \frac{2}{5} \qquad 3$$

$$= 137.3 \text{ W/cm}^2 \times \frac{2}{5} = 54.92 \text{ W/cm}^2$$

The foil loss is given by the equation below:

$$\text{Foil Loss} = 50 \text{ W/cm}^2 \times \frac{3}{5} = 30 \text{ W/cm}^2 \qquad 4$$

Combining the results of equations 3 and 4, the total average loss for the ribs and foil of the FIG. 4 configuration is 84.92 W/cm$^2$.

This represents a dramatic reduction of power loss and drain on the cooling system from the configuration of FIG. 3.

Figure 5:
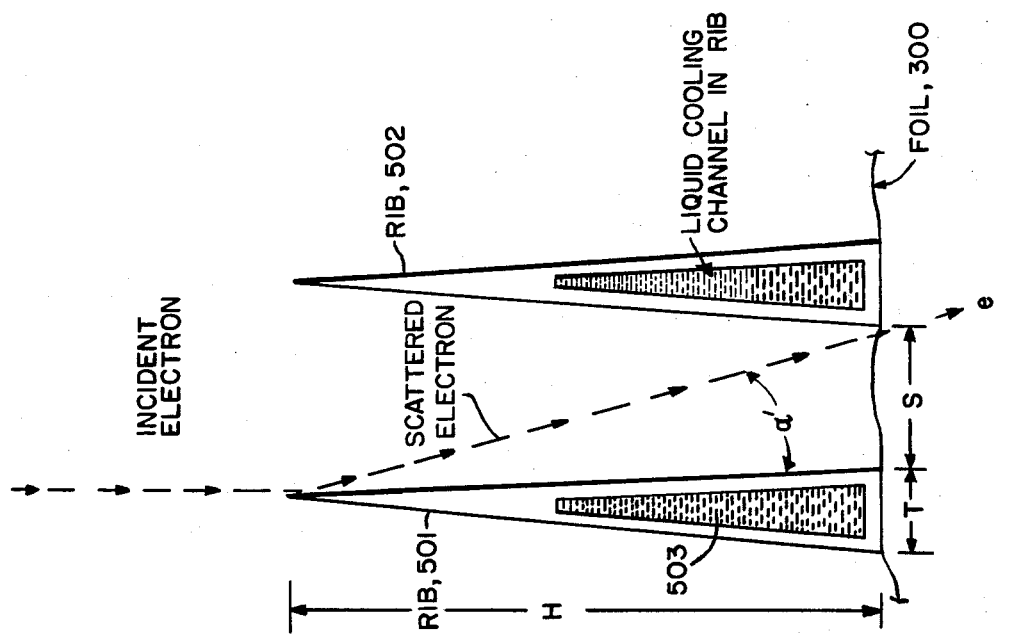
FIG. 5 is an illustration of another embodiment of the invention.

FIG. 5 is an illustration of another embodiment of the invention. Instead of adding knife edges 401 and 402 to an existing set of ribs 301 and 302, FIG. 5 shows the application of tailored triangular shaped ribs 501 and 502 supporting the foil 300. The geometry of ribs 501 and 502 is designed around the "one bounce" concept. That is, the incident electron beam in striking a rib, is permitted one bounce before passing on through the foil.

To achieve the "one bounce" effect, the support ribs are designed with a triangular cross section with the dimensions and relations chosen such that an incident electron striking anywhere on the surface of the rib will scatter at an angle $\alpha'$ and will then not strike the adjacent rib but will pass thru the foil. The algebraic and trigonometric relation are:

$$\alpha' = \frac{1}{2}\tan^{-1}\frac{T/2 + S}{H} \qquad 5$$

$$H = \frac{T}{2\tan\alpha'} \qquad 6$$

where:
T=the base width of the rib
S=space between ribs at the base
H=height of the rib
$\alpha'$=the angle the rib side makes with the incident electron which is perpendicular to the base
$\alpha'$=also the angle the electron scatters at from the rib surface The severe heat loading on excimer laser e-gun foil support structures results in a high risk situation for foil reliability and life and requires extraordinary measures to accomplish the overall heat transfer. For example, consider the typical structure in FIG. 1. The ribs are 2 mm×20 mm with 3 mm spacing. The average e-beam incident power is 500 W/cm$^2$ and the average foil deposition is about 50 W/cm$^2$. The average power loading on the foil and support structure depicted on FIG. 3 is 230 W/cm$^2$.

So the cooling system must carry 230 W/cm$^2$ average and is predominantly burdened by the 200 W/cm$^2$ rib contribution.

If it is assumed that small grazing angle electrons reflect off the rib surface with approximately equal incident and reflected angles and that the energy scattered into the ribs is approximately proportional to the sine the incident angle—then if one designs ribs as shown in FIG. 4, b, such that the slope of the rib is such that reflected electrons glance off once (a) or twice (b) and then go thru the foil, the overall heat load can be greatly reduced and the effective transmission factor can be almost 100%. For example, the angle of the wedge in FIG. 4, as given by equation 1, is:

$$\alpha = \tan^{-1}\frac{S}{H} = 8.53°$$

In this case the electrons bounce twice and hit the foil so the loss to the ribs, as shown by equation 3, is:

$$L_{R2} = 500 \sin \alpha + 500 (1 - \sin \alpha) \sin \alpha = 137.3 \text{ W/cm}_2$$

and the total average structure and foil loss, as shown by equation 4 is:

$$137.3 \times 2/5 = 54.92$$

$$50 \times 3/5 = \frac{30}{84.92 \text{ W/cm}^2}$$

which is only 37% of the original non-angled ribs. But now the total transmitted power has gone up, so the incident beam can be backed down and still further reduce the heat load. The original transmitted power is:

$$P_{TO} = (500 - 50) \times 3/5 = 270 \text{ W/m}^2 \text{ average}$$

The average transmitted power for the two bounce case of FIG. 4 is:

$$P_{T2} = 500 \times 3/5 - 50 + 500 \times 2/5 - 84.92 - 50 = 315 \text{ W/cm}^2 \quad 7$$

So for the same transmitted power as the rectangular rib case, the incident power and loss can be backed down to New incident power = $250/315 \times 500 = 397 \text{ W/cm}^2$  (8)

Average loss = $250/315 \times 84.92 = 67.4 \text{ W/cm}^2$ loss  (9)

So now the total average heat load corresponding to the same net transmitted power is only 29.3% of what it was. If one uses the one bounce design in FIG. 5, a further slight improvement is possible.

65.3 W/cm² average loss or 28.4% of the original.

Also note that the normal loading on the rib surface goes from 500 W/cm² to about 3.7 W/cm² which greatly eases the conduction problem to the liquid coolant.

Figure 6:
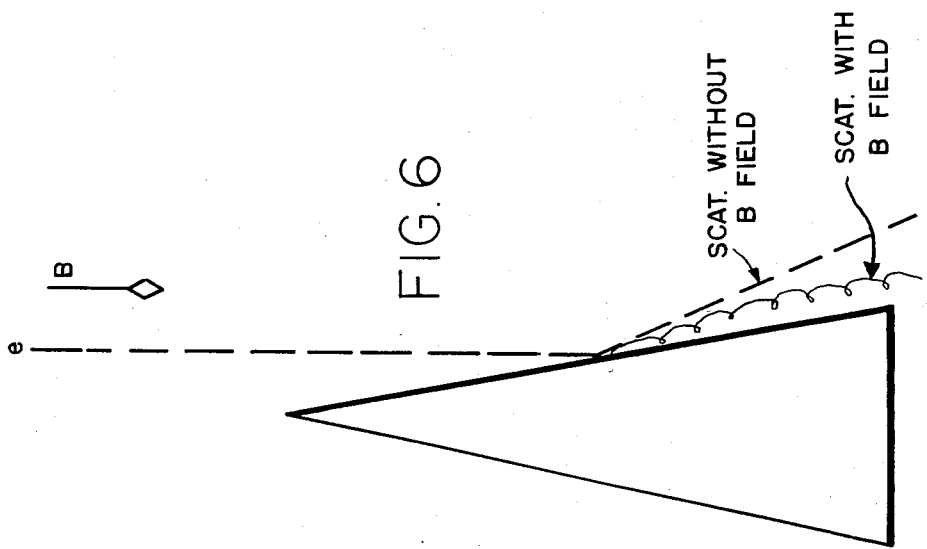
FIG. 6 is an illustration of another embodiment of the invention.

The additional complications of adding a magnetic guide field might actually help matters as suggested in FIG. 6. That is if without the field the electrons reflect at an angle about equal to the incident angle—then with the field they will reflect (with other motions) at an effective average angle, which is less than the incident angle—this will allow for ribs with smaller heights.

FIG. 6 is a sketch of the qualitative effect of a magnetic field (B-field) on electron scattering. In FIG. 6, when electrons strike rib 600 in the presence of the B-field, the angle of reflection is less than the angle of incidence due to the influence of the B-field. The reduced reflection angle results in the allowing ribs of shorter heights to be used to support the foil.

Figure 7:
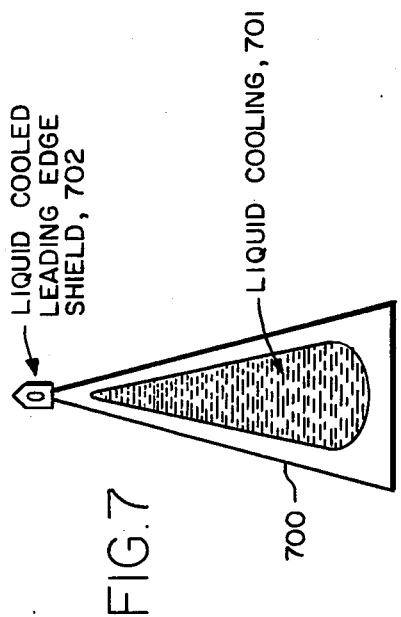
FIG. 7 is an illustration of another embodiment of the invention.

FIG. 7 is a sketch of another embodiment of the tailored triangular rib of FIG. 5. In the triangular shaped rib 700 of FIG. 7, in addition to the internal liquid cooling channel 701, the rib 700 has a liquid cooled leading edge shield 702 to prevent overheating and stress induced failure.

Figure 8:
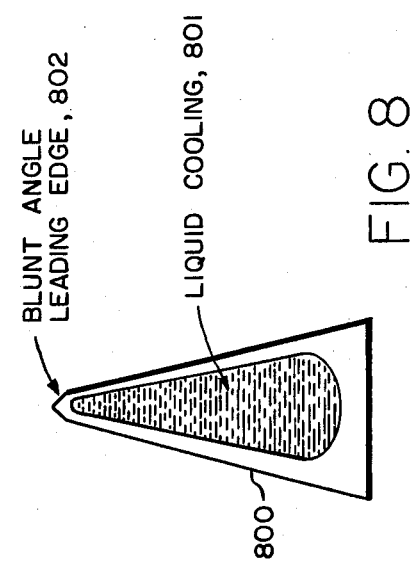
FIG. 8 is an illustration of another embodiment of the invention.

FIG. 8 is a sketch of another embodiment of the tailored triangular rib of FIG. 5. In the triangular shaped rib 800 of FIG. 8, the internal liquid cooling channel 801 is in proximity to a blunt angle leading edge 802, which allows closer coupling to liquid cooling, to prevent overheating and stress induced failure.

Figure 9:
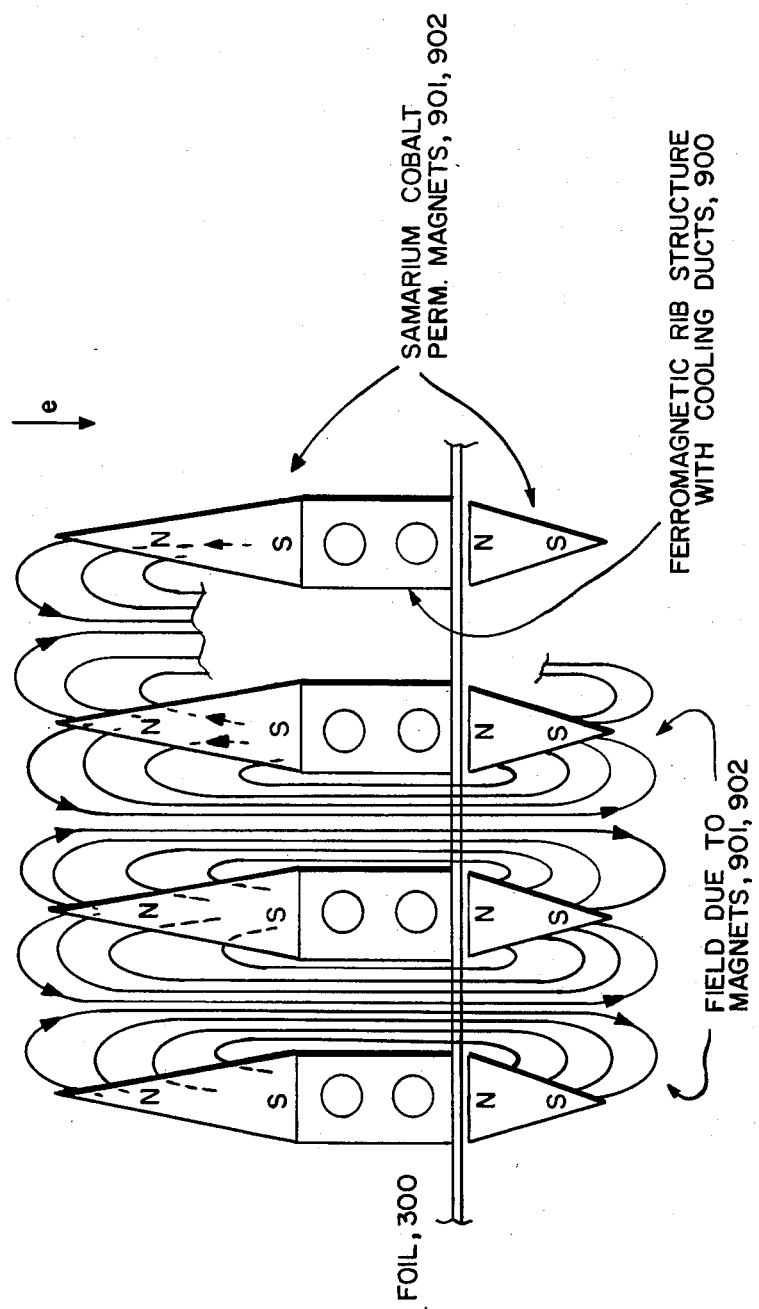
FIG. 9 is an illustration of another embodiment of the invention.

FIG. 9 is an illustration of another embodiment of the invention in which the conventional rectangular ribs 900 are made of ferromagnetic material and the upper and lower triangular-shaped knife edges 901 and 902 are samarium cobalt magnets typically such as samarium cobolt or other suitable material positioned as shown in the upstream nose wedge and in a downstream post foil field shaper. Also, the structural and cooling portions of the rib are ferromagnetic.

Figure 10:
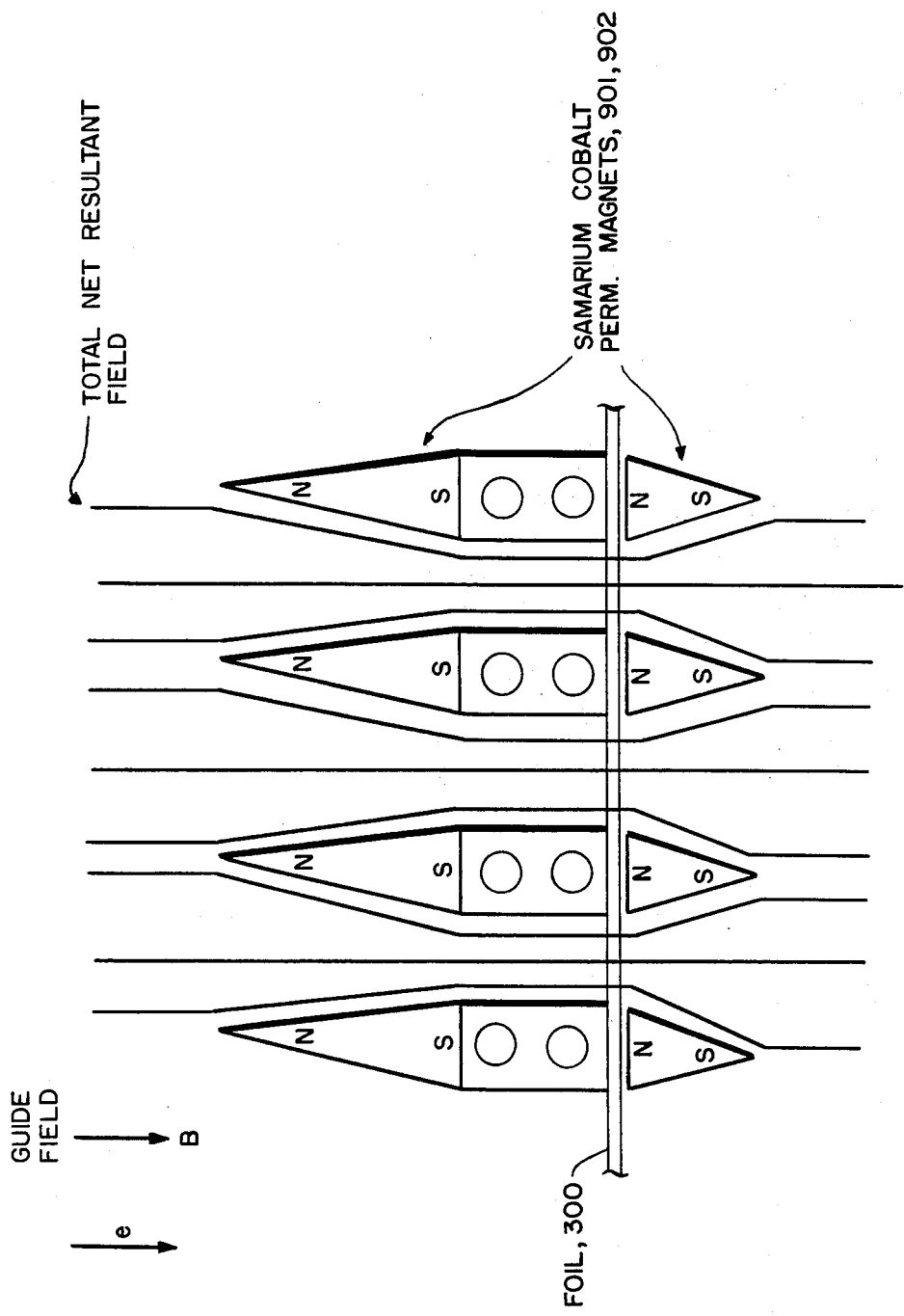
FIG. 10 is an illustration of the resultant magnetic field around the embodiment shown in FIG. 9.

FIG. 10 is an illustration of the total net resultant field around the embodiment of the invention shown in FIG. 9. The total net resultant field is a product of both the magnets 901 and 902 and a 2 kilogause guide field which is generated externally to the samarium cobalt permanent magnets 901 and 902.

The high energy content of samarium cobalt is sufficient to buck out up to about 2 kilogauss of main guide field in the rib structure and set up a net field which pinches through the ribs as shown in the sketch. If the magnet temperature can be held low enough, this pinched field structure around the ribs will aid in pinching the electrons through the rib slots and then expanding the beam after it passes through. This same approach would also apply to the E-field shorting screen in the drift-transport regions of E-beam systems.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a laser having an electron gun with a cathode emitting a beam of electrons which pass through at a foil into a chamber, an electron beam gun foil support comprising:

a plurality of ribs of rectangular cross sections, each having a top end facing said beam of electrons and a lower end supporting said foil; and a plurality of fins of triangular cross sections, each capping the top end of a rectangular rib, each of said triangular ribs being oriented to reduce all grazing angles of said electrons on said rectangular rib.

2. An electron beam gun foil support as defined in claim 1 wherein each of said ribs of triangular cross sections comprises:

a knife edge having a shape of a triangular cross section, the base of said triangle being of thickness value T and the length value of said triangle H' being approximately the value given by the equation:

$$H' = H\left[1 + \frac{T}{2S}\right]$$

where H is the height of each of said rectangular ribs, T is the thickness value of each of said rectangular ribs, and S is the value of the distance that separates each of said rectangular ribs from each other.

3. In combination with a laser having an electron gun with a cathode emitting a beam of electrons which pass through a thin foil into a chamber, an electron beam gun foil support comprising:

a plurality of ribs with triangular cross sections, each having a base supporting said foil and a cross section of triangular shape, said triangular shape presenting a reduced grazing angle to said beam of electrons.

4. An electron beam gun foil support as defined in claim 3 wherein each of said ribs with triangular cross sections produces a grazing angle A given by the equation:

$$A = \tfrac{1}{2} \tan^{-1}\left[\frac{T/2 + S}{H}\right]$$

where:
T equals the thickness at the base of each ribs with triangular cross sections; H equals the height of each rib and S equals the spacing of each rib.

5. An electron beam gun foil support as defined in claim 4 wherein each of said ribs with triangular cross sections has a height of value H given by the equation:

$$H = \frac{T}{2 \tan A}$$

where: T is the thickness at the base of each ribs with triangular cross sections, and A is the desired grazing angle of said beam of electrons on each rib.

6. An electron beam gun foil support as defined in claim 5 wherein each of said ribs with triangular cross sections includes:
an internal liquid cooling channel being housed in said ribs with triangular cross sections and conducting away heat generated by said beam of electrons striking said ribs with triangular cross sections; and
a liquid cooled leading edge shield at the top of each said ribs with triangular cross sections and conducting away heat generated by said beam of electrons.

7. An electron beam gun foil support as defined in claim 5 wherein each of said ribs with triangular cross sections include:
an internal liquid cooling channel being based in said ribs with triangular cross sections and conducting away heat generated by said beam of electrons striking said ribs with triangular cross sections; and
a blunt angle leading edge at the top of each said ribs with triangular cross sections allowing closer coupling to said internal liquid cooling channel, said blunt angle leading edge reducing overheating and stress induced failure in said ribs with triangular cross sections.

8. In combination with a laser having an electron gun with a cathode emitting a beam of electrons which pass through a foil into a chamber, an electron beam gun foil support comprising:
a plurality of ribs with rectangular cross sections each composed of a ferromagnetic material and, each having a top facing said beam of electrons and a lower end supporting said foil; and
a plurality of top fins of triangular cross sections, each capping the top end of a rectangular rib, each of said top fins of triangular cross sections being selected from materials which are suitable magnets producing a magnetic field, including samarium cobalt, each of said top fins of triangular cross sections having a cross sectional shape of a triangle or other similar shape, the base of said top fins of triangular cross sections being attached to a top end of one of said rectangular ribs and containing one effective pole of said magnetic field, the tip of said triangle containing the pole of said magnetic field, each of said top fins of triangular cross sections being oriented to reduce all grazing angles of said electrons on said rectangular rib.

9. An electron beam gun foil support as defined in claim 8 including a plurality of lower triangular magnets, each having a cross sectional shape of a triangle with a base attached to said foil beneath a lower end of one of said rectangular ribs, each of said lower triangular magnets being typically samarium cobalt or other suitable magnet material producing a magnetic field with one pole of said field being at the base of said triangle and the opposite pole of said magnetic field being at the tip of said triangle of said lower triangular magnet, said lower triangular magnet being oriented to reduce all grazing angles of said electrons on said rectangular rib.

* * * * *